United States Patent [19]

Kertz

[11] 4,287,621
[45] Sep. 8, 1981

[54] STEERING WHEEL ATTACHMENT

[75] Inventor: Charles A. Kertz, Egg Harbor, N.J.

[73] Assignee: Susanna A. Kertz, Egg Habor, N.J.

[21] Appl. No.: 117,298

[22] Filed: Jan. 31, 1980

[51] Int. Cl.³ .................. A47C 70/02; B60R 21/00
[52] U.S. Cl. ........................................ 5/440; 5/434;
74/558; 150/52 M; 224/276; 280/750
[58] Field of Search ............... 224/273, 276; 5/434,
5/490, 440; 74/558, 558.5; 150/52 M; 280/750,
751

[56] References Cited
U.S. PATENT DOCUMENTS

| 2,810,221 | 10/1957 | Reifsnyder | 224/276 X |
| 3,011,802 | 12/1961 | Ackerman | 280/750 X |
| 3,189,367 | 6/1965 | Glass | 74/558.5 X |
| 3,222,694 | 12/1965 | Schick | 5/440 X |
| 3,884,092 | 5/1975 | Raudebaugh | 74/558.5 X |
| 4,102,377 | 7/1978 | Ostrem | 150/52 M |
| 4,165,125 | 8/1979 | Owen | 5/434 X |

FOREIGN PATENT DOCUMENTS

| 2005421 | 9/1971 | Fed. Rep. of Germany | 280/750 |
| 27322 | 9/1905 | United Kingdom | 74/558 |
| 691836 | 5/1953 | United Kingdom | 150/52 M |

Primary Examiner—Stephen Marcus
Attorney, Agent, or Firm—Nathaniel A. Humphries

[57] ABSTRACT

A steering wheel attachment has a foam cushion pad with a cylindrical outer surface, upper and lower flat parallel surfaces, and a linear diameter surface dimensioned to overlie the upper half of a steering wheel with a cover enclosing the pad and a pocket panel on the back of the cover matingly fitting over the steering wheel to hold the pad in position to permit a user to rest head and arms on the pad; a rigid stiffener panel inside the cover prevents actuation of the horn button of the steering wheel to which the pad is attached.

3 Claims, 4 Drawing Figures

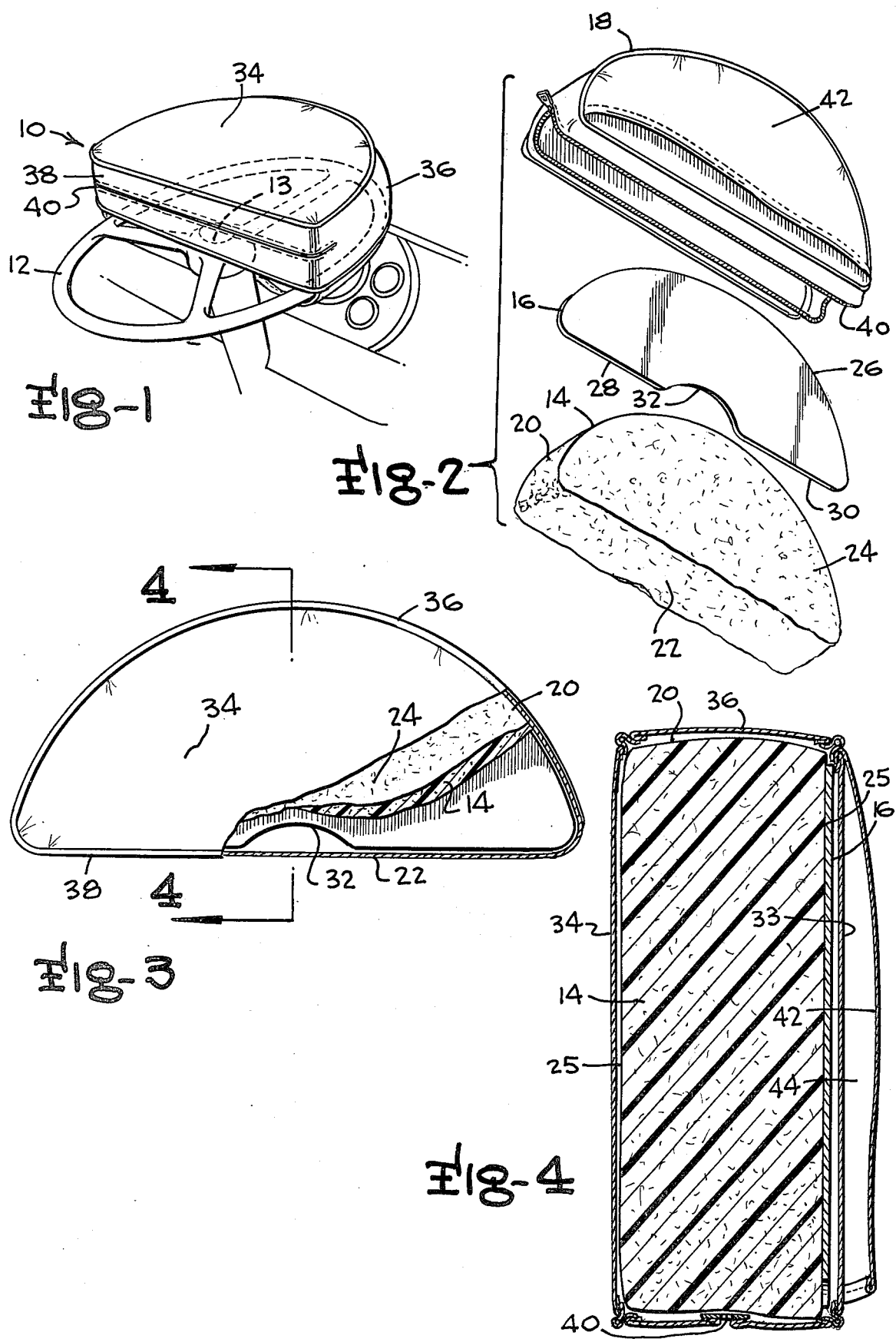

STEERING WHEEL ATTACHMENT

BACKGROUND OF THE INVENTION

This invention is in the field of motor vehicle accessories and is more particularly directed to a cushion pad mountable on the upper half of a steering wheel for permitting the user to rest head and arms on the cushion pad while the vehicle is parked to nap and/or rest.

Drivers of motor vehicles frequently become tired and fatigued and consequently find it necessary to attempt to become rejuvenated by napping or resting while the vehicle is parked such as in a rest stop. The foregoing problem is particularly acute for long distance truck drivers who, due to the lack of suitable space in the cab for assuming a prone position, find that the only way in which they can obtain any rest is to simply position their head and arms about the upper portion of the steering wheel in an effort to rejuvenate their senses by sleep or simply resting. Drivers of small bucket seat equipped sports cars and the like have essentially the same problem. Unfortunately, vehicle steering wheels are made of hard material and do not provide a comfortable pillow effect for the foregoing purposes; moreover, it sometimes occurs that a driver will fall fast asleep and slump or otherwise move into contact with the horn button of the wheel to result in a blowing of the horn to consequently wake the driver with a great shock. Moreover, such accidental blowing of the horn is a substantial annoyance to both the driver and others in the vicinity.

A variety of cushions and steering wheel covers have been proposed in prior U.S. Pat. Nos. 3,189,367; 4,102,377 and 4,165,125 and in British Pat. No. 27,322 (1904); however, the devices of these patents do not solve the foregoing problem.

Thus, it is the primary object of this invention to provide a new and improved means for permitting a vehicle driver to comfortably nap or rest while in the driver's seat of a parked vehicle.

Achievement of the foregoing object is enabled by the preferred embodiment of the invention which comprises a cushion pad member formed of foam rubber or the like having flat parallel upper and lower surfaces and having a cylindrical peripheral surface having an extent of approximately 180° and connected at opposite ends by a linear diameter portion. The periphery of the cushion pad conforms to the upper half of the periphery of a steering wheel with which the device is to be used. A flexible cloth or plastic cover encloses the cushion pad member and a relatively inflexible stiffener panel formed of fiberboard or the like is positioned adjacent the lower face of the cushion pad inside the cover. A pocket panel on the lower side of the cover fits over the steering wheel to retain the attachment in position on the wheel for usage. The stiffener panel member has an outer periphery generally conforming with that of the cushion pad but is provided with a recess so that it does not contact the horn button of the steering wheel with which the device is used. The stiffener panel does not engage the horn button but resists deflection of the cushion pad into contact with the horn button to prevent depression of the button and consequent actuation of the vehicle horn when the user rests his upper body portion, arms and head over the attachment when it is in position on the steering wheel.

A better understanding of the nature and construction of the preferred embodiment will be achieved when the following detailed description is considered in conjunction with the appended drawings in which like reference numerals are applied to the same component parts when illustrated in different figures of the drawings.

DESCRIPTION OF THE DRAWINGS

FIG. 1 is a perspective view of the preferred embodiment positioned on a steering wheel;

FIG. 2 is an exploded perspective view of the components of the preferred embodiment;

FIG. 3 is a top plan view of the preferred embodiment with portions removed for the sake of illustration; and FIG. 4 is a sectional view taken along lines 4—4 of FIG. 3.

DESCRIPTION OF THE PREFERRED EMBODIMENT

Attention is initially invited to FIG. 1 of the drawings which illustrates the preferred embodiment of the invention, generally designated 10, mounted on the upper face of a truck steering wheel 12 in a position so that the driver of the truck can simply lean forward and rest his upper body portion, arms and head thereon.

The preferred embodiment of the invention is comprised of three primary elements consisting of a cushion pad or body 14, a stiffener panel 16 and a cover member 18.

Cushion pad or body 14 has an outer cylindrical peripheral surface 20 having an extent of approximately 180° between its opposite end terminations which are connected to the opposite ends of a linear planar diameter surface 22 of rectangular peripheral configuration. An upper planar surface 24 is oriented perpendicular to the cylindrical surface 20 and the linear planar diameter surface 22 and a lower planar surface 25 is oriented in a plane parallel to the plane of upper planar surface 24.

Stiffener panel 16 includes a curved circular outer edge portion 26 coextensively aligned with the outer cylindrical peripheral surface 20 of the cushion pad or body 14 with the opposite ends of the curved circular outer edge portion 26 being connected to the outer ends of a first linear edge portion 28 and a second linear edge portion 30 which linear edge portions are aligned with linear planar diameter surface 22. The inner ends of the first and second linear edge portions 28 and 30 are connected to the outer ends of an inwardly extending cut-out portion in the form of an arcuate recess 32. Arcuate recess 32 is shaped and dimensioned so that it does not overlie the horn button 13 of the steering wheel with which the device is used.

Cover 18 includes a lower panel 33 adjacent the stiffener panel 16 and an upper panel 34 adjacent the cushion pad or body 14. Additionally, cover 18 includes a peripheral panel 36 contiguous with the cylindrical peripheral surface 20 of the cushion pad or body 14 and a diameter panel 38 in which a zipper 40 or other closure is provided for permitting removal of the cover from the other components. A pocket panel 42 is attached to the outer edge of peripheral panel 36 and is shaped and dimensioned to fit over the steering wheel 12 as shown in FIG. 1.

In use, the steering wheel attachment is mounted on the steering wheel in the manner illustrated in FIG. 1 so as to permit the user to rest his head and arms over the attachment for napping or resting while the vehicle is parked. The recess 32 assures that the stiffener panel 16 will not depress and actuate the horn button.

It should be understood that numerous modifications of the preferred embodiment will occur to those of skill in the art which will not depart from the spirit and scope of the present invention which is to limited solely by the appended claims.

I claim:

1. A steering wheel attachment comprising a cushion body shaped to overlie a portion of a steering wheel of a vehicle, a cover enclosing said cushion body and a mounting means on said cover dimensioned to snugly fit over a steering wheel for mounting and restraining said cover and cushion body on the upper face of such steering wheel, wherein said cushion body comprises a foam pad having periphery formed of a cylindrical surface of approximately 180° degrees peripheral extent and a planar diameter surface extending between the end terminations of said cylindrical surface, an upper planar surface and a lower planar surface and additionally including a stiffener panel having a periphery contiguous with the periphery of said foam pad, said stiffener panel being positioned adjacent said lower planar surface inside said cover for preventing deflection of said foam pad beyond the plane of the upper surface of said steering wheel and wherein said stiffener panel periphery additionally includes a cut-out portion for precluding the application of force to the horn button of said steering wheel by said stiffener panel.

2. A steering wheel attachment comprising a cushion body shaped to overlie a portion of a steering wheel of a vehicle, a cover enclosing said cushion body and a mounting means on said cover dimensioned to snugly fit over a steering wheel for mounting and restraining said cover and cushion body on the upper face of such steering wheel, wherein said cushion body comprises a foam pad having a periphery formed of a cylindrical surface having a diameter exceeding the diameter of said steering wheel of approximately 180° degrees peripheral extent between the end terminations of said cylindrical surface, an upper planar surface and a lower planar surface and additionally including a stiffener panel having a periphery contiguous with the periphery of said foam pad, said stiffener panel being positioned adjacent said lower planar surface inside said cover for preventing deflection of said foam pad beyond the plane of the upper surface of said steering wheel and wherein said stiffener panel periphery includes a cut-out portion for precluding the application of force to the horn button of said steering wheel by said stiffener panel.

3. A steering wheel attachment comprising a cushion body shaped to overlie a portion of a steering wheel of a vehicle, a cover enclosing said cushion body and a mounting means on said cover dimensioned to snugly fit over a steering wheel for mounting and restraining said cover and cushion body on the upper face of such steering wheel, wherein said cushion body comprises a foam pad having a periphery formed of a cylindrical surface having a diameter exceeding the diameter of said steering wheel of approximately 180° degrees peripheral extent between end terminations and a planar diameter surface extending between the end terminations of said cylindrical surface, an upper planar surface and a lower planar surface and additionally including a stiffener panel having a periphery contiguous with the periphery of said foam pad, said stiffener panel being positioned adjacent said lower planar surface inside said cover for preventing deflection of said foam pad beyond the plane of the upper surface of said steering wheel and wherein said cover comprises upper and lower panels respectively having circular peripheral edge portions contiguous with said upper and lower planar surfaces and a peripheral panel contiguous with said cylindrical surface and said planar diameter surface and said mounting means comprises a pocket panel overlying said lower panel and means connecting said pocket panel to said lower panel adjacent the peripheral edge of said lower panel and said stiffener panel periphery includes a cut-out portion for precluding the application of force to the horn button of said steering wheel by said stiffener panel.

* * * * *